United States Patent
Brush et al.

(10) Patent No.: US 10,408,623 B2
(45) Date of Patent: Sep. 10, 2019

(54) RETRACING STEPS

(75) Inventors: Alice Jane Brush, Seattle, WA (US); James W. Scott, Cambridge (GB); Galen C. Hunt, Bellevue, WA (US); Raman K Sarin, Redmond, WA (US); Andrew W Jacobs, Silver Spring, MD (US); Barry C. Bond, Maple Valley, WA (US); Oscar E Murillo, Redmond, WA (US); Amy Karlson, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1368 days.

(21) Appl. No.: 12/484,089

(22) Filed: Jun. 12, 2009

(65) Prior Publication Data

US 2010/0318293 A1 Dec. 16, 2010

(51) Int. Cl.
*G01C 21/00* (2006.01)
*G01C 21/34* (2006.01)
*G01C 21/20* (2006.01)
*G01C 21/16* (2006.01)

(52) U.S. Cl.
CPC .......... *G01C 21/20* (2013.01); *G01C 21/165* (2013.01)

(58) Field of Classification Search
USPC .......... 701/400, 408–409, 431, 433–434, 701/445–446, 465, 467–469, 491, 701/500–501, 516, 526–527, 541; 340/539.1, 539.11, 539.13
See application file for complete search history.

(56) References Cited

U.S. PATENT DOCUMENTS

| | | | |
|---|---|---|---|
| 5,583,776 A * | 12/1996 | Levi et al. | 701/400 |
| 6,132,391 A * | 10/2000 | Onari et al. | 600/595 |
| 6,321,158 B1 * | 11/2001 | DeLorme et al. | 701/426 |
| 6,407,698 B1 | 6/2002 | Ayed | |
| 6,489,921 B1 | 12/2002 | Wilkinson | |
| 6,571,193 B1 * | 5/2003 | Unuma et al. | 702/141 |
| 6,581,000 B2 * | 6/2003 | Hills et al. | 701/467 |
| 6,839,626 B2 * | 1/2005 | Yamakita et al. | 701/433 |

(Continued)

OTHER PUBLICATIONS

"IPhone App Helps You Find Your Parked Car", retrieved on May 13, 2009 at <<http://www.gizmag.com/iphone-app-helps-you-find-your-parked-car/9609/>>, GIzmag, Jul. 11, 2008, 3 pages.

(Continued)

*Primary Examiner* — Christian Chace
*Assistant Examiner* — Kyung J Kim
(74) *Attorney, Agent, or Firm* — Drinker Biddle & Reath LLP

(57) ABSTRACT

Techniques for creating breadcrumbs for a trail of activity are described. The trail of activity may be created by recording movement information based on inferred actions of walking, not walking, or changing floor levels. The movement information may be recorded with an accelerometer and a pressure sensor. A representation of a list of breadcrumbs may be visually displayed on a user interface of a mobile device, in a reverse order to retrace steps. In some implementations, a compass may additionally or alternatively be used to collect directional information relative to the earth's magnetic poles.

19 Claims, 13 Drawing Sheets

(56) References Cited

U.S. PATENT DOCUMENTS

| | | | |
|---|---|---|---|
| 7,256,711 B2 * | 8/2007 | Sheha et al. | 340/995.1 |
| 7,295,920 B2 | 11/2007 | Finkelstein | |
| 7,373,820 B1 * | 5/2008 | James | 73/488 |
| 7,379,743 B2 | 5/2008 | Bostrom et al. | |
| 7,411,518 B2 | 8/2008 | Ratnakar | |
| 7,432,854 B2 | 10/2008 | Motoyama | |
| 7,526,718 B2 * | 4/2009 | Samadani et al. | 715/201 |
| 7,565,155 B2 * | 7/2009 | Sheha et al. | 455/456.1 |
| 7,602,302 B2 * | 10/2009 | Hokuf et al. | 340/573.3 |
| 7,769,542 B2 * | 8/2010 | Calvarese et al. | 701/501 |
| 8,525,673 B2 * | 9/2013 | Tran | 340/540 |
| 2003/0013459 A1 * | 1/2003 | Rankin et al. | 455/456 |
| 2004/0217884 A1 * | 11/2004 | Samadani et al. | 340/995.14 |
| 2005/0165541 A1 | 7/2005 | Noguchi et al. | |
| 2006/0125644 A1 * | 6/2006 | Sharp | 340/573.1 |
| 2007/0030121 A1 | 2/2007 | Soliz | |
| 2008/0004036 A1 * | 1/2008 | Bhuta et al. | 455/456.1 |
| 2008/0077326 A1 * | 3/2008 | Funk et al. | 701/220 |
| 2011/0207471 A1 * | 8/2011 | Murray et al. | 455/456.1 |
| 2012/0136529 A1 * | 5/2012 | Curtis et al. | 701/32.2 |

OTHER PUBLICATIONS

Tweney, "IPhone App Helps You Find Your Parked Car—or Your Lunch Hour Walk", retrieved on May 13, 2009 at <<http://www.wired.com/gadgetlab/2008/08/iphone-app-help/>>, Gadget Lab, Aug. 1, 2008, 2 pages.

* cited by examiner

RETRACING STEPS

BACKGROUND

Typically, a conventional navigation system helps users locate routes or paths from one location to other locations. However, the conventional navigation systems use maps, streets, and/or a Global Positioning System (GPS) to locate routes or paths. A problem exists with the conventional navigation systems when the user is in a building or other structure, where there are no street identifiers or a map. Another problem may be attributed to a poor or nonexistent connection to GPS satellites due to the user being inside a building or other structure, due to reflection off the exteriors of large buildings or other objects, due to destructive interference of the signals from towers in urban areas, or due to the type of construction materials used in some buildings. These problems make it impossible to rely on the conventional navigation systems to find paths or routes. Thus, when a recorded route or a recorded path is needed later, there would not be one available to help the individual retrace steps.

Another problem occurs when an individual parks their vehicle in an underground parking garage with multiple vertical levels. Often, the conventional navigation systems do not allow the individual to distinguish between floors of the same parking garage. In particular, using conventional navigation systems, a vehicle parked in space 12 on the first floor may look the same as space 12 on the third floor.

Another problem with conventional navigation systems is that they typically require a user to initiate a function to activate recording the route or the path. The user may be in a hurry or preoccupied with other things and forget to turn on the function to record. Thus, when a recorded route or a recorded path is needed later, there would not be one available to help the individual retrace steps.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure describes creating a trail of activity, for example, to help users retrace steps to locate a vehicle, to find an item, or to send the trail to a friend to locate a user. The process creates "breadcrumbs" for the trail of activity to record movement information based on inferred actions of the user. The movement information for each breadcrumb may be identified with contextual information, such as whether the user was walking or not walking (e.g., running or riding in a vehicle) or whether the user was changing floor levels (e.g., walking up or down stairs, moving on an escalator, or riding in an elevator). The movement information may be collected using an accelerometer and a pressure sensor to analyze whether to add the movement information to an existing breadcrumb or to create a new breadcrumb. The breadcrumbs are compiled together to create the trail of activity. Also, a visual representation of a recorded trail of breadcrumbs may be displayed on a user interface and/or presented audibly to the user.

In some implementations, a compass may be used to collect directional information relative to the earth's magnetic poles to associate with the breadcrumbs.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
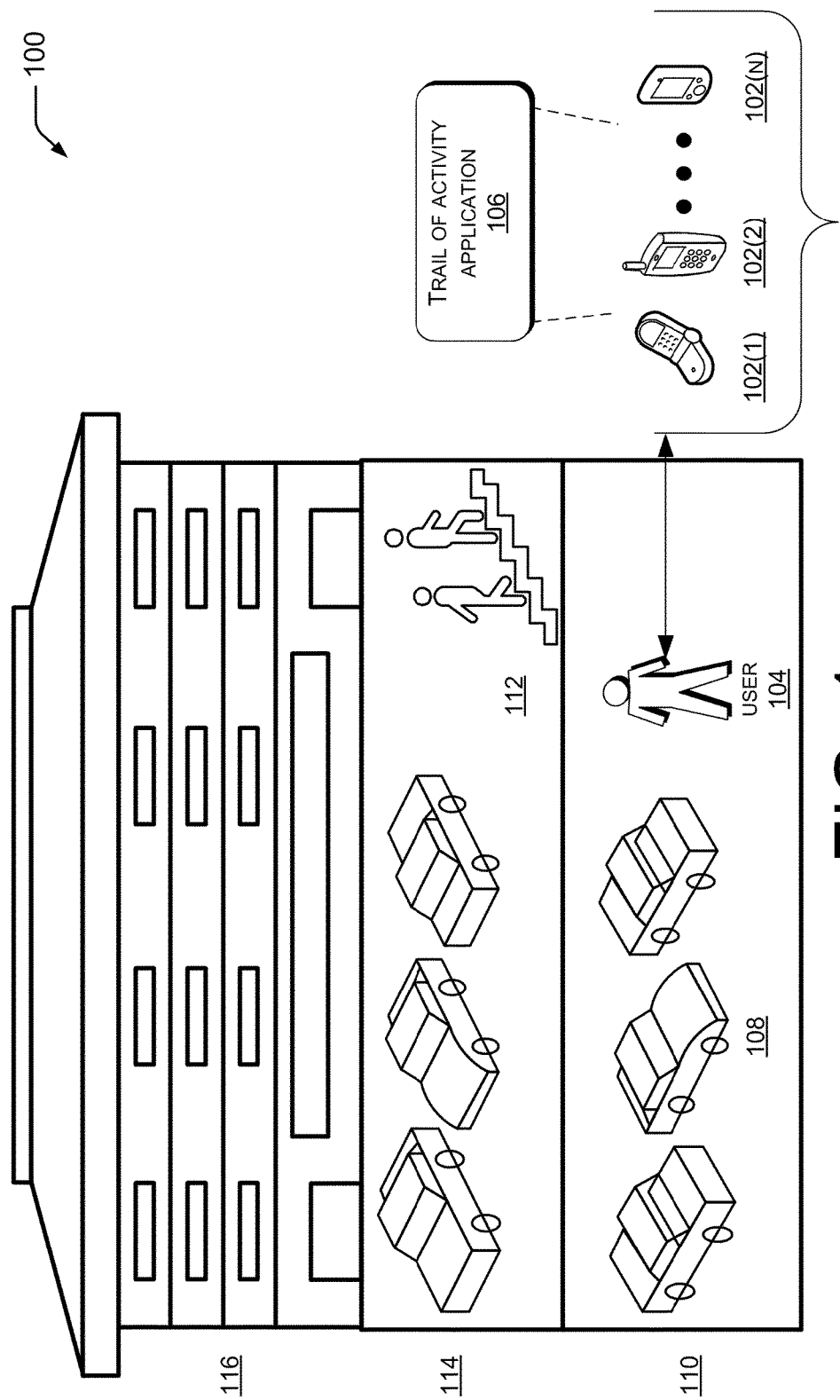
FIG. 1 is a block diagram of an exemplary environment for creating a trail of activity breadcrumbs.

As discussed above, conventional map-based or GPS navigation systems may not always provide an effective way for a user to retrace steps. For example, in some instances (e.g., in a building or an underground garage), it may be difficult to find a signal to implement conventional navigation systems. Moreover, conventional navigation systems may not be able to readily distinguish between vertical locations (e.g., a parking space on the first floor and the same parking space on the second floor). This disclosure describes various exemplary ways of creating, recording, and presenting "breadcrumbs" for a trail, without relying on maps, streets, or availability of a GPS signal. This allows users to use the information to retrace steps to, for example, locate a vehicle in an underground garage that conventional map-based or GPS navigation systems do not.

In one implementation, when a user drives a vehicle and parks in an underground garage, a mobile device may begin recording a trail of activity automatically. This may occur based on detecting that the vehicle is no longer travelling, such as the mobile device detecting no engine noise or a personal area network device losing an association with the mobile device. The trail of activity comprises a series of breadcrumbs. Each breadcrumb is a derived quantity using an inference algorithm on the sensor data collected on the mobile device. The breadcrumbs may be defined by the movement information (e.g., changes in 3D location), directional information (e.g., changes in direction), and/or ambient sensor data (e.g., strength of WiFi and other various ambient signals).

Movement information is recorded using sensors based on inferred actions of the user. Examples of sensors that may be used to record the movement information include, without limitation, an accelerometer to record acceleration, a barometric pressure sensor to record changes in elevation, a temperature sensor, a light sensor, and/or GPS or cell-tower-based location information (when available).

In some instances, data pertaining to a direction relative to the earth's magnetic poles is collected for the trail of activity. The data collected is referred to as directional information, which may be recorded by a navigation instrument relative to the earth's magnetic poles or other fixed points of reference. An example of a navigation instrument to collect and to record directional information includes, without limitation, a compass.

Other sensors may also be used to collect ambient sensor data, which may additionally or alternatively be associated with the breadcrumbs. The ambient sensor data may provide a signature or "fingerprint" usable to identify particular locations. These fingerprints may be used, for example, to help identify when a user may be in a current location that was previously recorded in a trail of activity. In that case, sensor data including signal strengths of any nearby WiFi access points, GPS, other stationary devices broadcasting radio communications signals, radio stations, or other electromagnetic radiation may be compared with recorded sensor data for one or more stored breadcrumbs. A probability that a breadcrumb corresponds to the user's current location may be determined by comparing sensor information for the user's current location to information in a saved breadcrumb. The probability indicates a likelihood that a user is near a desired breadcrumb or trail. In some implementations, the device may determine which breadcrumb has the closest fingerprint to the user's current location, thereby indicating which breadcrumb is likely the closest to the user's current location.

The mobile device may visually present a representation of breadcrumbs for the trail on the user interface. This visual representation allows the user to view overviews of whole trails, portions of trails, and/or details of individual breadcrumbs to assist the user in following the path that the trail indicates, in either a forward or a reverse direction. Realtime sensor data may be used by the trail program to automatically choose the "current" breadcrumb. One example of use of this visual representation is that the user may retrace their steps to locate a vehicle or other item. Another example is that a user may follow a trail, e.g. that their colleague sent, to find a particular location that their colleague previously travelled and have recorded as a trail. This visual representation also allows the user to visually verify that a recorded trail is accurate, and optionally edit the trail, before it is saved or sent to another mobile device.

Various techniques are described for creating, recording, and presenting breadcrumbs for a trail of activity. By way of example and not limitation, movement information may be recorded with or without directional information, with or without GPS information, and with or without a photo of the environment.

Illustrative Environment

FIG. 1 is a block diagram of an exemplary environment 100 in which a trail of activity may be created. The environment 100 includes exemplary mobile devices 102(1), 102(2), . . . , 102(N), which may take a variety of forms, including, but not limited to, a cellular telephone 102(1), a smart phone 102(2), a PDA, or any other mobile device 102(N) capable of hosting sensors to record the movement and the directional information. The mobile device 102 is typically carried daily in a pocket or a purse by a user 104.

In the illustrated example, the user 104 carries the mobile device 102 that has a trail of activity application 106. In this example, the user 104 parked their vehicle 108 on a lower level 110 of an underground garage. In a conventional GPS or map-based navigation system, the user 104 would not be able to receive a signal for a GPS unit, or to identify a map for the underground garage to record a path. However, using the techniques described herein, the trail of activity application 106 is not only able to record the path in the underground garage but to automatically start recording the trail once the mobile device 102 has detected no engine noise, when the vehicle is in a parked position. That is, the trail of activity application 106 may start recording when the user 104 exits the vehicle, and may record the user 104 walking up the stairs 112 to the second level 114 and walking through the building 116 to their office. Alternatively, the trail of activity application 106 may start recording as soon as a GPS signal, wireless signal (e.g., a signal from a Bluetooth® hands free device in the vehicle, a signal from a Wi-Fi access point in the office, or a broadcast radio signal), or other signal is lost.

In the illustrated example, the mobile device 102 may cease recording upon detecting a GPS signal (e.g., when the user exits the garage or building) or a wireless signal (e.g., a signal from a Bluetooth® hands free device in the vehicle, a signal from a WiFi access point in the office, or a broadcast radio signal). Other ways of cease recording are described below.

Exemplary Mobile Device

Figure 2:
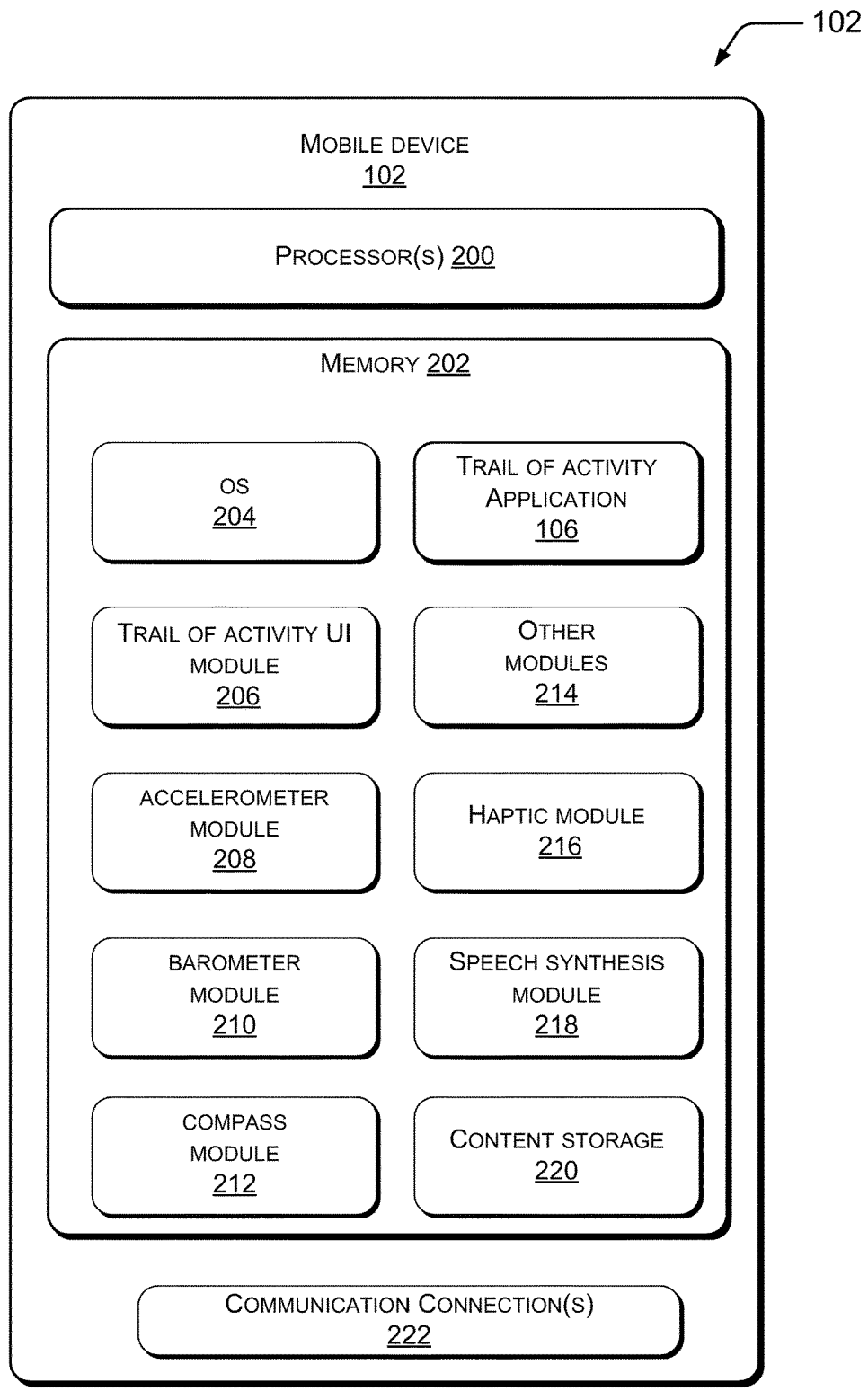
FIG. 2 is block diagram showing an exemplary mobile device usable to create, record, and store the trail in the environment of FIG. 1.

FIG. 2 is a block diagram showing an exemplary mobile device 102 configured to generate trails of activity. The mobile device 102 may be configured as any suitable device capable of implementing the trail of activity application 106. In one exemplary configuration, the mobile device 102 includes a processor 200 and memory 202.

Turning to the contents of the memory 202 in more detail, the memory 202 may store computer instructions that are loadable, embedded, or encoded, and executable on the processor 200. The memory 202 includes an operating system 204, the trail of activity application 106, and a trail of activity user interface (UI) module 206 that, when executed on the processor 200, collectively facilitate presentation of a user interface on a display of the mobile device 102. Details of several illustrative user interfaces that may be presented are described below in FIGS. 3-9.

In an implementation, the memory 202 includes an accelerometer module 208 and a pressure sensor module 210 (e.g., a barometer or a digital pressure sensor) to collect acceleration and elevation data for recording the movement information and a compass module 212 to receive direction data relative to the earth's magnetic poles for recording directional information. In some implementations, the accelerometer module 208 and the pressure sensor module 210 collect sensor data for the movement information without the directional information.

The memory 202 may also include other modules 214 including, but not limited to, a magnetometer module, a wireless local area network module, a global positioning system (GPS), a cellular radio module, an amplitude modulated (AM) and/or frequency modulated (FM) radio module, a temperature module, an audio module, a light module, and the like. Alternatively, any or all of these other modules 214 may be embodied as integrated circuits or, sensors, or other hardware devices, rather than being implemented as software modules stored in memory. In one implementation, the wireless personal area network module of the mobile device 102 may lose a wireless signal from a personal device located in the vehicle (e.g., a hands free dialing device), indicating the personal device is no longer in range. Once this connection is lost, the trail of activity application 106 may automatically start collecting sensor data for recording the movement information. In some implementations, the mobile device 102 may additionally or alternatively lose a signal from a GPS unit, which may automatically start collecting data.

In another implementation, the temperature module may be used to detect that the user 104 with the mobile device 102 has left the vehicle to start recording. This occurs when the temperature sensor detects a change in temperature reading for a predetermined time interval. For example, the temperature changes when moving the mobile device 102 from the vehicle (e.g, warm temperature) in the underground garage (e.g., cooler temperature) to an office located inside a building (e.g., warmer temperature). The trail of activity application 106 may start and stop making inferences based on the recording of the movement information due to the temperature changes that occur within a time period. For example, the temperature change may occur during approximately about a five-minute period.

In another example, the various sensing modules in FIG. 2 may detect movement of the mobile device 102 travelling from the underground parking garage until the sensors detect no movement, for a predetermined time interval. For example, a time interval of approximately seven to ten minutes, indicates that the mobile device 102 is stationary in the office. The trail of activity application 106 may terminate recording the movement and the directional information. The trail of activity application 106 interacts with the accelerometer module 208, the barometer module 210, and the compass module 212 to automatically start collecting the sensor data and recording the information for breadcrumbs for the trail of activity.

In another example, the trail of activity application 106 may start recording when it detects by audio that the vehicle engine is being turned off. The detection may also occur through monitoring a vibration that the engine causes based on information collected by the accelerometer or directly signaled by the vehicle based on data networking. In a further example, the trail of activity application 106 may detect the user's motion in exiting the vehicle (e.g. the user moving from sitting to standing) based on information collected by the accelerometer or other sensors, and use that as a signal to start recording the trail. In yet another example, the trail of activity application 106 may perform short-term continuous recording under circumstances where the user 104 is in the vehicle, so that if detection of the user 104 exiting the vehicle is delayed, the previous data is nonetheless recorded so that the breadcrumb trail may be created from the actual exit event rather than at a later time when the sensing of the exit event is unambiguous.

The memory also includes a haptic module 216 to provide feedback on the breadcrumbs. The haptic module 216 indicates through a vibration to the user 104 that the movements in a single breadcrumb have been completed or the user 104 is headed in the wrong direction. This helps give the user 104 an indication of whether one is headed towards the correct direction. For example, after movement in a breadcrumb has been completed, the mobile device 102 may vibrate to indicate to the user 104, to advance to the next breadcrumb, if headed in the correct direction. Alternatively, the mobile device 102 may vibrate to indicate to the user 104 when headed towards a wrong direction. Other alternatives of providing feedback to the user, including but not limited to a beep, displays in the environment that the user is heading towards the correct direction, or lighting an LED to help the user 104 retrace their steps. The display in the environment may be a unique symbol to move towards a particular direction. While the LED may light up to indicate to the user to head towards a particular direction.

The memory 202 also includes a speech synthesis module 218 that interacts with the UI module 206 and content storage 220 to perform trail of activity functions. A text-to-speech (TTS) system converts normal language text into speech using one or more known techniques. The speech synthesis module 218 creates audible speech from pieces of recorded speech stored in the content storage 220. In particular, the speech synthesis module 218 may present the movement and the directional information for the breadcrumbs in an audible manner. The speech synthesis module 218 may also include voice recognition functionality to convert readings for the movement information and the directional information to text using one or more known techniques.

The memory 202 also includes the content storage 220 for locally storing one or more trails, for storing GPS coordinates on a map, for storing new sensor data that is being collected of a user's current location with a wireless local area network module or with a global positioning system (GPS) module, for storing photos or images corresponding to the breadcrumbs of the trail, for storing recordable speech patterns, and the like. The memory 202 may also include one or more other applications or modules (not shown) for implementing various other functionality, such as an appointment calendar application, an email application, a word processing application, a media player application, and the like.

The mobile device 102 may also contain communications connection(s) 222 that allow the processor 200 to communicate with servers, the user terminals, other mobile devices, and/or other devices on a network. The communication connection(s) 222 may include a wide area network (WAN) module, a local area network module (e.g., Wi-Fi), a personal area network module (e.g., Bluetooth®), a navigation module (e.g., GPS), and/or any other suitable communication modules to allow the mobile device 102 to communicate over the network. In particular, the mobile device 102 may be in communication with the vehicle (or other object which the breadcrumb trail leads to) in order to, e.g., be signaled that the vehicle is stopped and the recording should begin for the trail. Also, the communication may be used in order to use sensors on other devices that may indicate the trail. For example, the user's vehicle may have sensors, such as pressure sensors, inertial tracking sensors, magnetometers, etc that allow the vehicle's movements to be tracked. This data, although it is not directly part of the breadcrumbs (as the vehicle may take a different path to the user) may help the trail of activity application 106 in creating accurate breadcrumbs. For example, the vehicle sensor indicates that the vehicle is located on floor 3, and the barometric pressure sensor on the mobile device gives ambiguous data when the user leaves the vehicle park. The data may indicate the user descended 2.5 floors (halfway between 2 and 3 floors). However, the vehicle's prior sensor data may be used to disambiguate this data and be more certain that the elevator travelled 3 levels of floors.

The trail of activity application 106 may also automatically discontinue or terminate recording the movement information for the trail. The recording may stop for many reasons including but are not limited to, detecting the mobile device 102 has been stationary for a predetermined time interval, detecting a GPS signal upon the user 104 exiting the office or coming out of the underground garage, sensing a temperature difference moving from the vehicle parked outdoors to the indoor office environment, and/or detecting a wireless signal (e.g., a signal from a Bluetooth® hands free device in the vehicle, a signal from a Wi-Fi access point in the office, or a broadcast radio signal).

Exemplary Mobile Device User Interface

FIGS. 3-9 illustrate exemplary user interfaces that may be presented on the mobile device 102 of the user 104. However, in certain instances, when a saved trail is transmitted to another mobile device, the trail may be presented on the other mobile device belonging to a recipient. Some mobile devices have large touch-screen interfaces, alpha-numeric keypads, and other forms of input and display. The user interfaces described below are illustrative of user interfaces usable with a touch-screen interface. However, other user interfaces may be used if other types of mobile devices are used.

Figure 3:
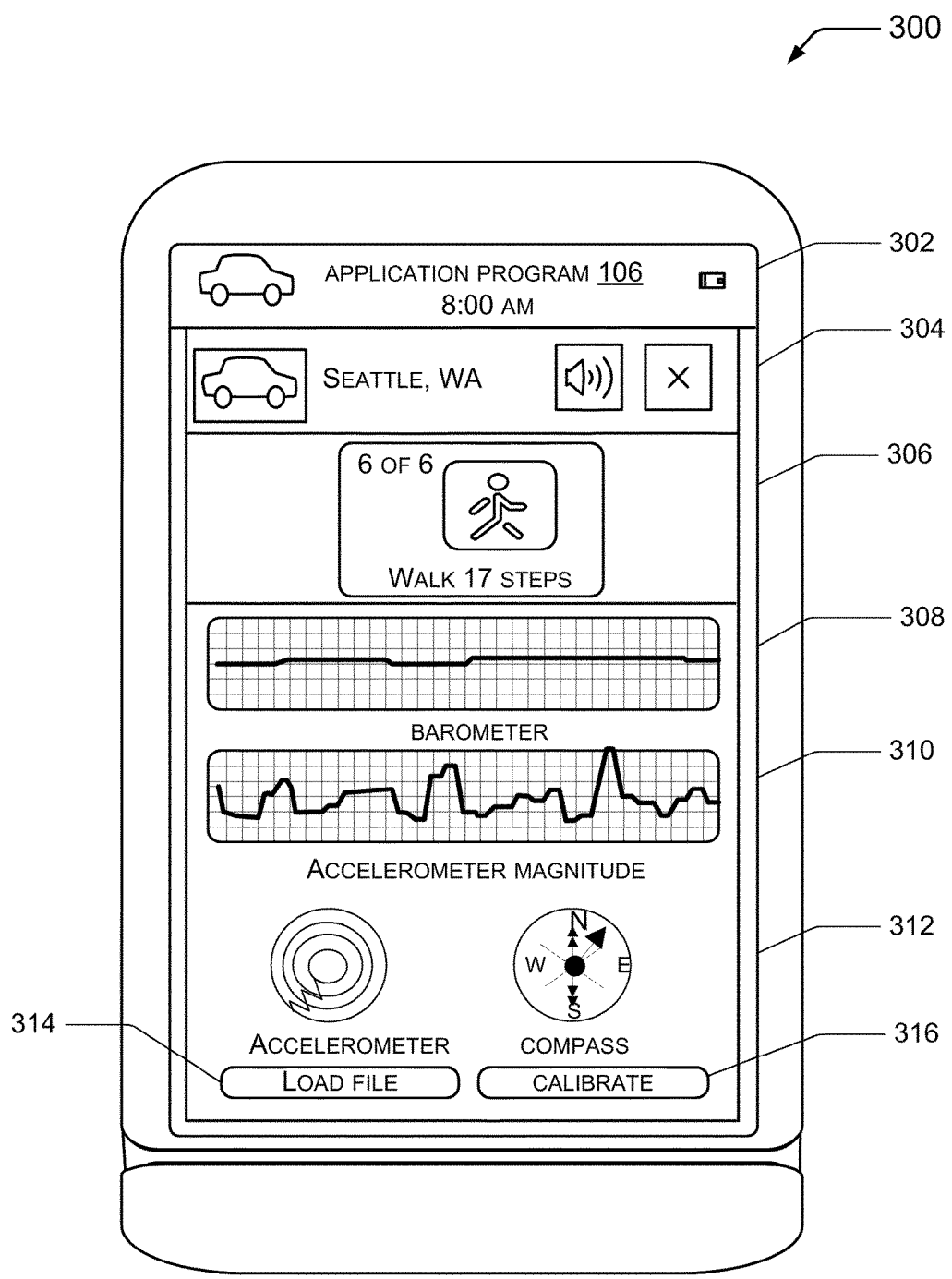
FIG. 3 is a schematic showing an exemplary user interface for display during recording of breadcrumbs for the trail.

FIG. 3 shows an exemplary user interface 300 for display during recording a breadcrumb for the trail of activity application 106. In this example, the user interface 300 includes a visual title application bar 302 that illustrates the trail of activity application 106 with a local time. Also shown is a visual trail bar 304 that has been retrieved from a list of saved trails. The visual trail bar 304 includes a diagram of a vehicle indicative that the trail is for locating the vehicle, a location for the vehicle such as "Seattle, Wash.", along with manual controls to be able to play audibly the recording of the trail and to be able to delete the trail.

As previously mentioned in an implementation, the trail of activity application 106 is automatically programmed to start recording the breadcrumbs for the trail. The recording may start upon detecting that the vehicle has stopped travelling due to the engine no longer making noise, the user 104 is walking versus riding in the vehicle, or the mobile device 102 is losing a signal with a personal area network device that is located in the vehicle.

The user interface 300 also displays a representation of a breadcrumb 306 to illustrate a current walking activity and a number of steps utilized for the walking activity, "6 of 6 Walk 17 Steps." A first number "6" indicates this is a sixth breadcrumb out of a total of "6" breadcrumbs in the trail. In the illustrated example, the trail 106 collects the barometer data 308 and the accelerometer magnitude data 310, and may display the collected information on the user interface 300. The data from the barometer and the accelerometer may be sampled at 10 Hz, or at any other suitable sampling frequency.

The trail of activity application 106 computes the movement information based on the collected acceleration and changes in elevation data. A change in barometric pressure determines whether the user 104 is walking up or down the stairs. In some implementations, an average barometric pressure reading is being compared to a maximum barometric pressure and a minimum barometric pressure to determine whether the user 104 is changing floor levels, such as walking up or down stairs or riding in an elevator. A barometric pressure change greater than approximately 50 pascal (Pa) is identified as an elevation change. When the barometric pressure change occurs during a period of at most about eight seconds of time, this may be representative of riding in an elevator and when the pressure change occurs during a period of more than eight seconds of time, this may be representative of walking up or down the stairs. The trail of activity application 106 also computes the movement information based on a magnitude of accelerometer data to determine whether a user 104 of the mobile device 102 is walking or not walking, and to count peaks representing a number of steps for walking. The trail of activity application 106 computes the magnitude of the accelerometer data when the changes are approximately greater than 0.2 times the force of gravity (g).

The user interface 300 may also include a field showing an accelerometer and a compass 312. The accelerometer may measure magnitude and relative direction. The compass receives directional information, a direction relative to the earth's magnetic poles. As shown, the face of the compass highlights the cardinal points of north, south, east, and west.

The user interface 300 also includes a "Load File" field 314 by which the user 104 may save or import the sensor data for each of the breadcrumbs into the memory and/or code the sensor data into the movement information. The Load File may be used to load a file of the stored sensor data collected, for demonstration or debugging purposes. In the illustrated example, the user interface 300 also includes a "Calibrate" field 316. Selection of the Calibrate field 316 may cause the accelerometer, the barometer, and/or the compass to be calibrated. Typically, a measuring equipment manufacturer generally assigns a measurement tolerance, suggests a calibration interval, and specifies the environmental range of use and storage. The user 104 may assign an actual calibration interval, which is dependent on the specific accelerometer, barometer, and compass likely usage levels. In some implementations, natural fluctuations in barometric pressure may occur. When natural fluctuations occur, the user 104 may try to identify the user's current floor level in an underground garage, by re-calibrating previously collected sensor data to determine the floor level the user 104 should go.

Figure 4:
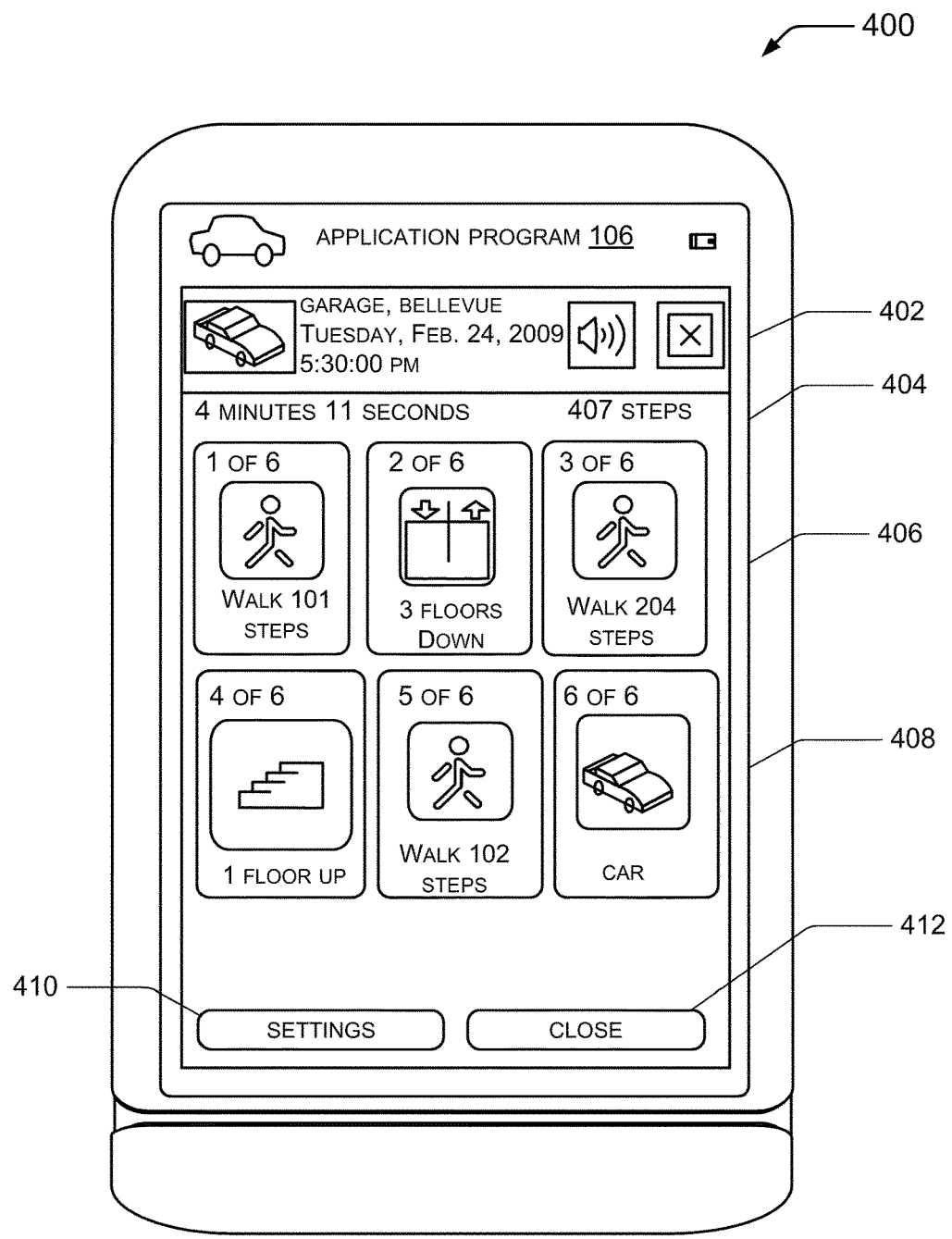
FIG. 4 is a schematic showing an exemplary user interface for displaying an overview representation of the breadcrumbs for the trail with movement information.

Similar user interface items that are described in FIGS. 3 and 4 will not be described in the other exemplary user interfaces in FIGS. 5-9. For illustrative purposes, locating a vehicle is shown in the exemplary user interfaces. However, there are other uses for the trail of activity application 106, such as to find the user 104 in a theatre, in a concert hall, or sports arena by attaching or embedding the file saved in a communication to transmit to another mobile device. In another implementation, the trail may be used to find lost objects by retracing steps to the location in which the object was last "seen" or tagged with a wireless signal identifier (e.g., in Bluetooth® range).

FIG. 4 shows another exemplary user interface 400 for displaying a representation of an overview of the breadcrumbs for the trail. In this exemplary user interface 400, the representation of the breadcrumb displays a number of walking steps and relative floor level information. The number of walking steps and relative floor levels are movement information from sensor data collected with the barometer and the accelerometer.

The user interface 400 includes a visual trail bar 402 with a diagram for a vehicle and a location identified for the vehicle such as a garage located in Bellevue, "Garage, Bellevue." The trail bar 402 also includes a day, as well as a local date and time, along with manual controls to be able to play audibly the recording of the trail and to be able to delete the trail. For example, the recording may indicate to the user 104, "Walk x steps" or "Walk x steps north".

The user interface 400 also includes a field showing an amount of time in minutes and seconds to move from an initial starting position to an end position, such as the vehicle. The field 404 shows "4 minutes 11 seconds", and that it takes approximately "407 Steps" to walk from a location to the vehicle. This gives an indication to the user 104 the amount of time and the number of steps to move from the location, such as the office to the vehicle.

The user interface 400 displays a summary of all of the breadcrumbs compiled for the "Garage, Bellevue" trail. The breadcrumbs are arranged into logical groups of walking, elevator, stairs, or car. For example, breadcrumbs 1-3 may represent being inside a building and breadcrumbs 4-6 may represent being inside the garage.

Figure 6:
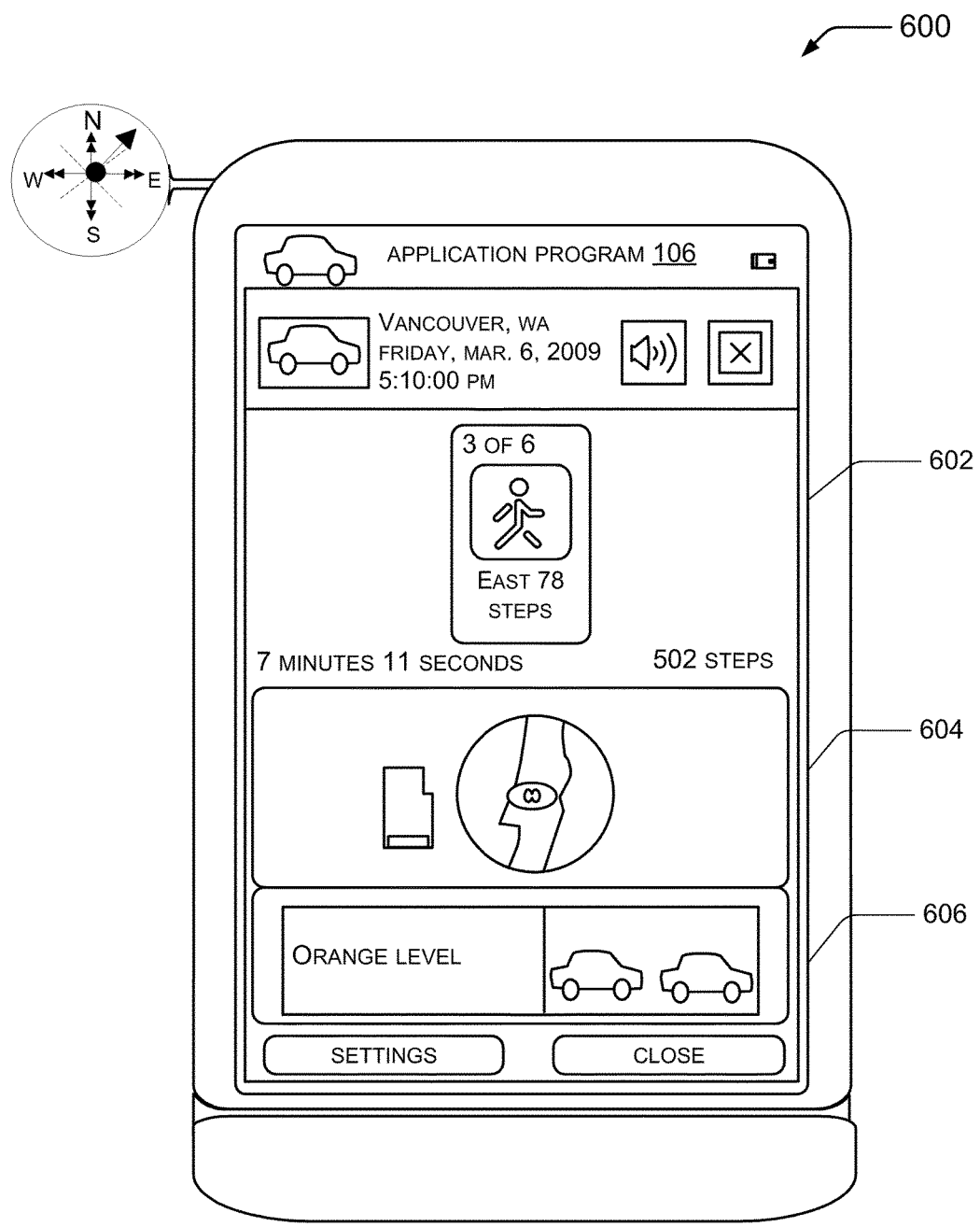
FIG. 6 is a schematic showing an exemplary user interface for displaying a detailed representation of a breadcrumb with a corresponding photo of the environment.
Figure 7:
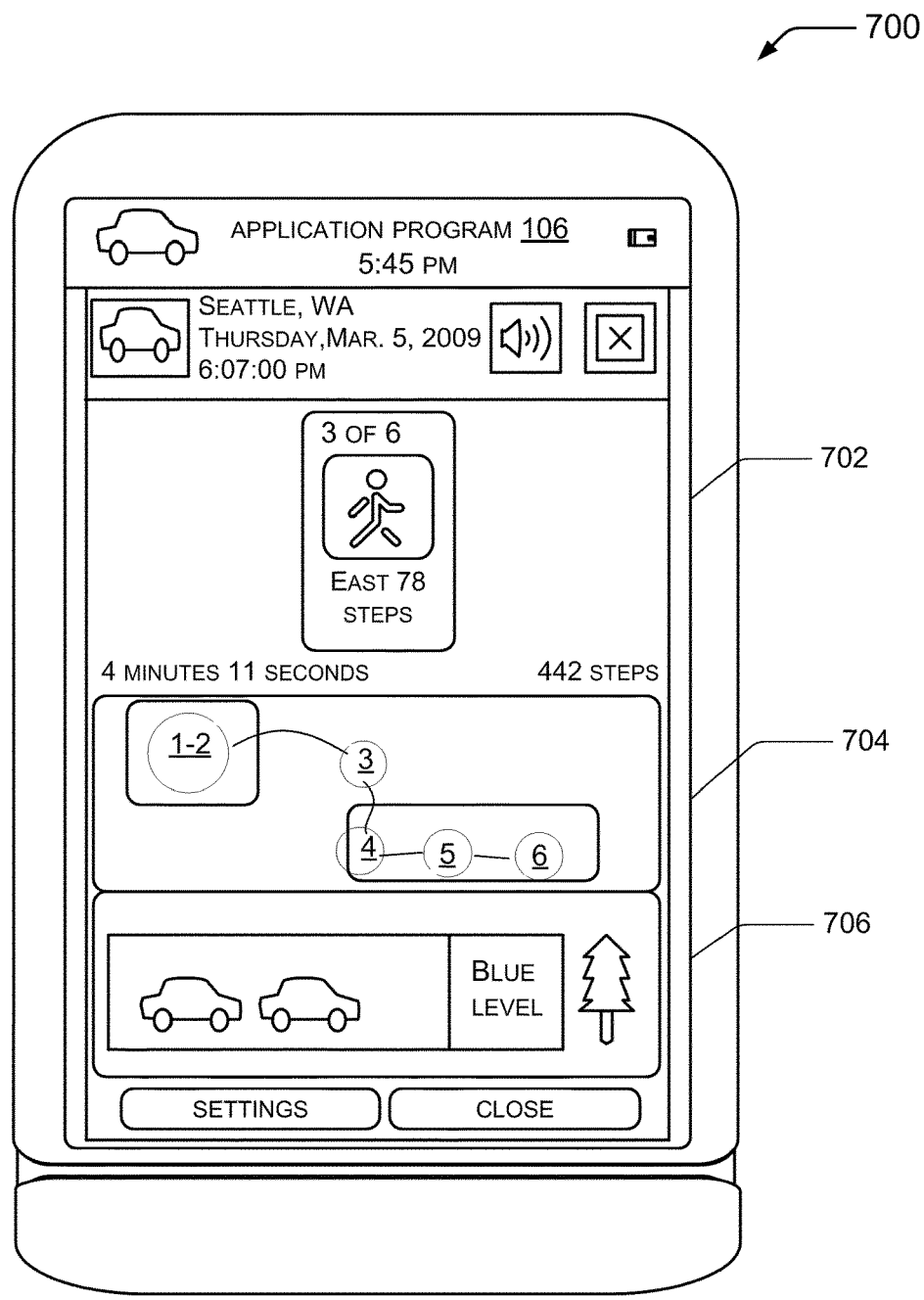
FIG. 7 is a schematic showing an exemplary user interface for displaying a detailed representation of a breadcrumb with corresponding information of a map with GPS coordinates and a photo of the environment.
Figure 8:
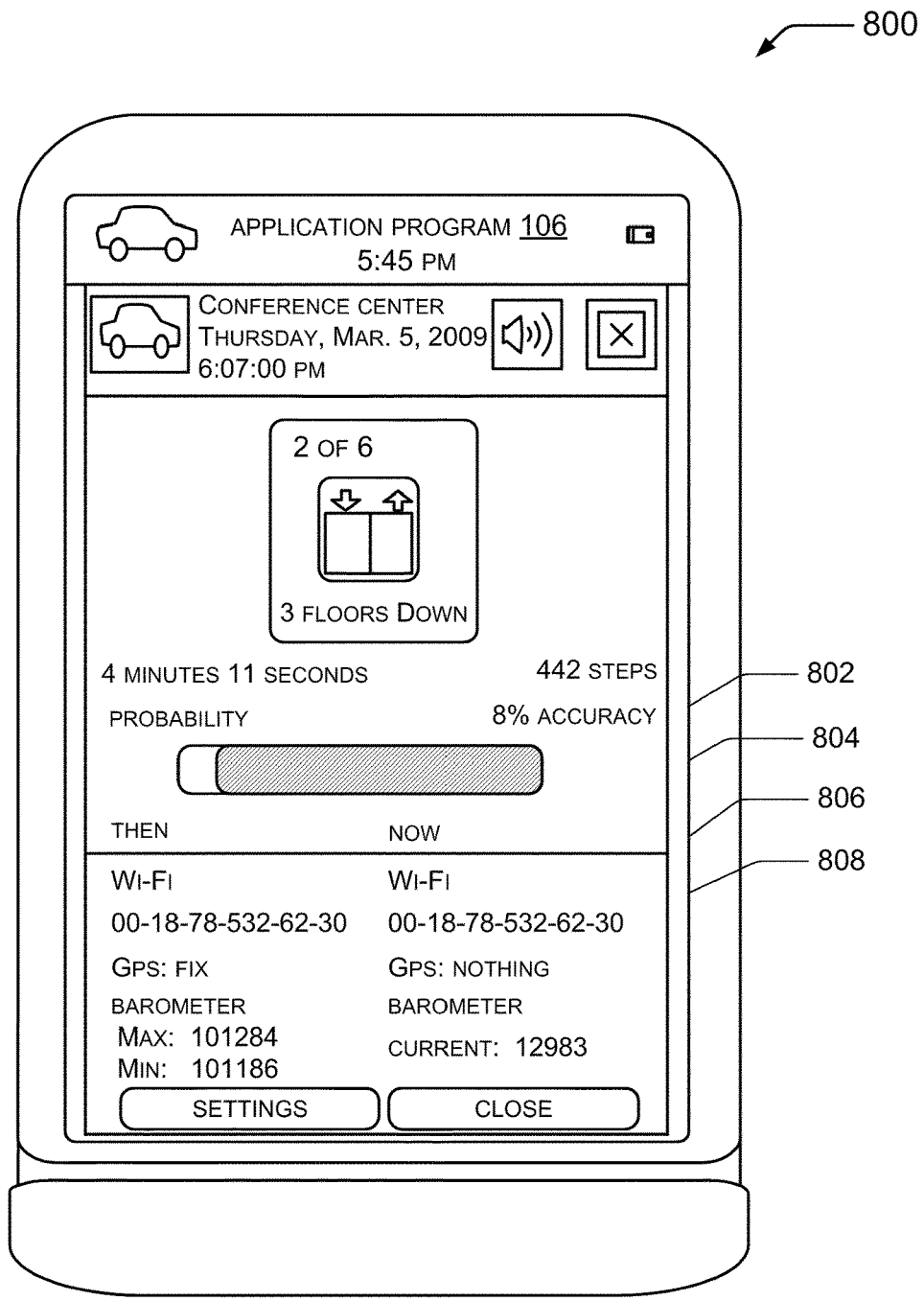
FIG. 8 is a schematic showing an exemplary user interface for displaying a probability that a breadcrumb from a saved trail, is near or not near to the user's current location.

Shown is a row of breadcrumbs 406, with three breadcrumbs, identified as "1 of 6", "2 of 6", and "3 of 6", indicating a first, a second, and a third breadcrumb for the trail. The first breadcrumb shows 1 of 6, a walking figure with "Walk 101 Steps." Depending on the sensor data collected every 10 Hz, the data collected may be for a new breadcrumb or may be added to an existing breadcrumb. The collected sensor data may reflect a change in barometric pressure, which is to create a new breadcrumb (e.g, Stairs Up when there is a floor level change). Alternatively, the sensor data may reflect no barometric pressure change, which suggests that the sensor data be added to the existing breadcrumb, such as additional steps taken if the user 104 is walking. Shown next in the row is a representation of an elevator in 2 of 6, an elevator figure, "3 Floors Down." Shown last in the row 406 is another representation of a walking activity breadcrumb. By tapping on or selecting a single breadcrumb in the overview, the user 104 may be presented with the breadcrumb selected of interest, by skipping the other breadcrumbs. The user interface may display the selected breadcrumb in detail. FIGS. 6-8 show representations of the breadcrumbs in detail.

Continuing to the next row of breadcrumbs 408, is a representation of stairs, 4 of 6, stairs figure, "1 Floor Up" in a fourth breadcrumb out of six breadcrumbs. Next is another representation of a walking activity breadcrumb in 5 of 6, and the last breadcrumb is an initial starting point, the vehicle which is 6 of 6. The two types of sensor data collected is the minimum information to help locate the vehicle. Furthermore, the breadcrumbs may be presented on the user interface in a reverse order starting with the last breadcrumb recorded to the first breadcrumb recorded, such as the initial starting point, the vehicle is 6 of 6.

The user interface 400 also includes a "Settings" control field 410 by which the user 104 may control the settings for the trail of activity application 106 and a "Close" field 412 by which the user 104 may close the trail of activity application 106.

Figure 5:
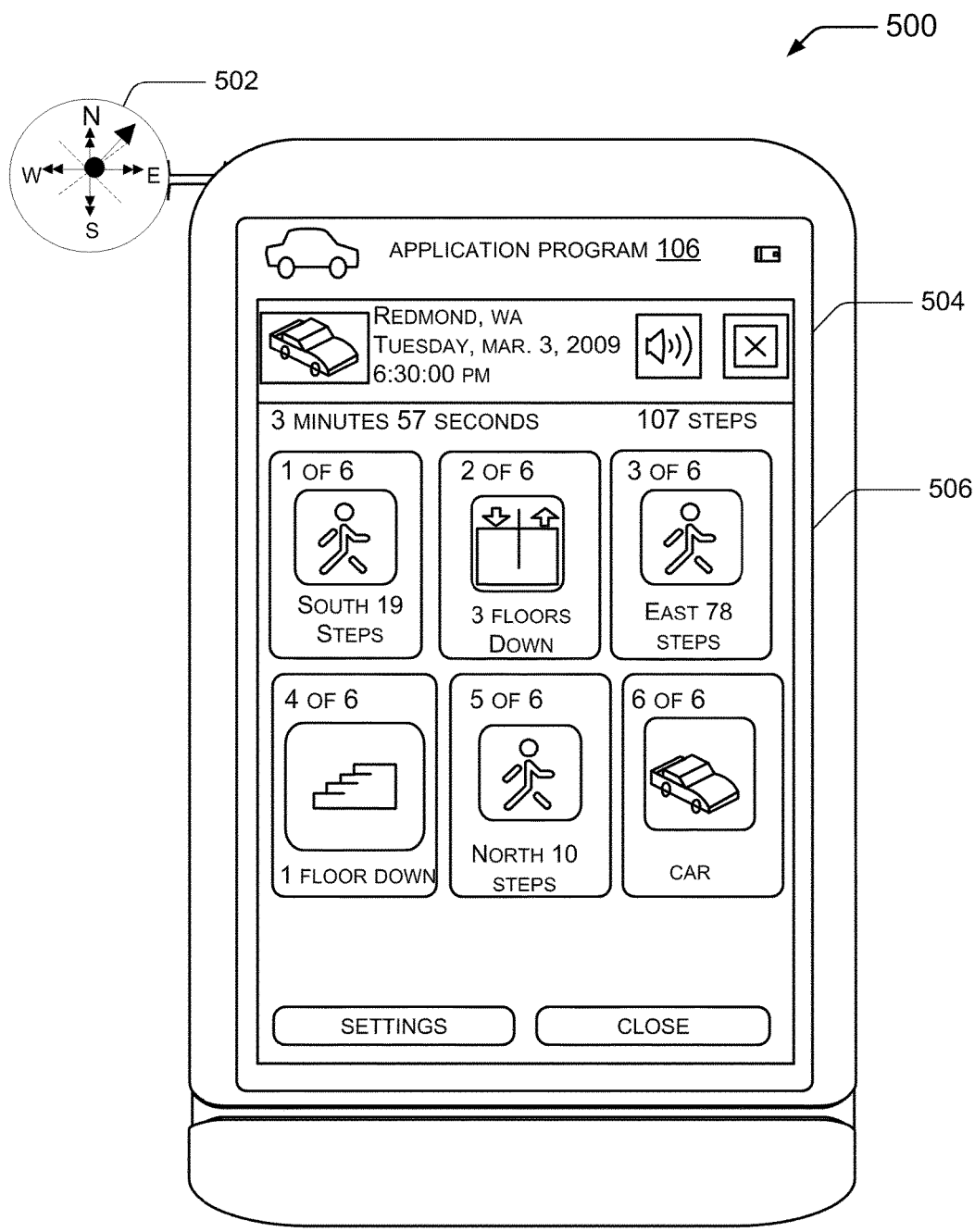
FIG. 5 is a schematic showing an exemplary user interface for displaying a representation of the breadcrumbs for the trail with movement information and directional information.

FIG. 5 shows another exemplary user interface 500 for displaying a representation of an overview of a trail. In this representation, the breadcrumbs for the trail include movement information and directional information. The overview of the movement and the directional information provides a summary of the breadcrumbs in one view. As previously mentioned, the user 104 may select a single breadcrumb and advance to a location represented in the breadcrumb, rather than going through all of the breadcrumbs.

In this illustrated example, the mobile device 102 includes a compass 502 attached to receive directional information relative to the earth's magnetic poles for the trail. The trail of activity application 106 augments and splits the walking activity breadcrumbs to include the major compass directions. For example, a number of walking steps would be split into a smaller number of walking steps by adding a direction for each of the smaller number. The number of 100 steps may be split into north 51 steps and east 49 steps. In another implementation, the mobile device 102 may include a magnetometer using inference algorithms to determine a 3D orientation of the mobile device, with respect to the user 104, to identify a direction for walking.

The user interface 500 includes a visual trail bar 504 with the name of the file saved as "Redmond, Wash.", a day, a date and the local time.

The user interface 500 shows the representation of the breadcrumbs with the major directional information in the walking breadcrumbs. For example, the first breadcrumb 506 shows 1 of 6, walking figure, "South 19 Steps." The other representations of the walking activity breadcrumbs 508 may identify the major directional information, such as whether to walk towards a direction of north, east, south, or west and a number of steps to walk. The other representations of the level breadcrumbs may indicate riding up or down in an elevator or walking up or down a flight of stairs, without the directional information.

FIG. 6 shows another exemplary user interface 600 for displaying a representation of a breadcrumb 602 that has been selected by the user 104. As previously mentioned, the user 104 may want to select the breadcrumb of interest, such as a second breadcrumb and skip a first breadcrumb. Shown in detail is the representation of the walking activity breadcrumb 602 that the user 104 selected from the trail of breadcrumbs. In certain instances, the user 104 may want to bypass the other breadcrumbs that are familiar to the user 104 and proceed directly to the breadcrumb of interest to help locate the vehicle. The user 104 may navigate between the breadcrumbs (not shown).

The user interface 600 shows a map 604 that has no GPS coordinates since there was no detection of a GPS signal. In some implementations, there may be detection of a GPS signal as shown in FIG. 7. The user interface 600 may display a representative photo or image 606 taken of the environment corresponding to each breadcrumb. The mobile device 102 may include periodic picture taking functionality on a lanyard or worn on a beltline, or a SenseCam type camera may be used to capture environment images every five seconds. The images may be a supplement to the accelerometer and the barometer data. In some implementations, the SenseCam type camera may be used with the directional information received from the compass. In this example, the image from the camera shows where the vehicle is parked, on an "Orange Level", a color identifier for a floor level.

FIG. 7 shows another exemplary user interface 700 for displaying a representation of a breadcrumb in detail that has been selected by the user 104. Shown is the representation of a walking activity breadcrumb 702 that the user 104 selected from the overview trail. A wireless signal (from a Bluetooth®, a Wi-Fi access point, a GPS unit, a broadcast radio) or cell-tower positioning information may be used to augment the breadcrumbs, when such information is available. The various signals or cell-tower positioning information may be used to "fingerprint" locations in the trail of breadcrumbs to automatically determine a current location of the user 104.

The user interface 700 shows a map 704 illustrating a representation of the user's current location on the map. The map numbers 1 to 6 correspond to the numbers for each of the breadcrumbs for the trail. For example, there are a total of 6 breadcrumbs, the numbers 1-2 are for the representation of the breadcrumbs identified as a first and a second breadcrumb, 1 of 6 and 2 of 6. The logical groupings of the breadcrumbs numbered 1-2 represent the location inside the building and breadcrumbs numbered 3-6 represent inside the garage. While the breadcrumbs numbered 1-2 do not have precise GPS locations, they may be deduced to represent steps that occurred inside the building by associating the breadcrumb labels with the building. The GPS signal may "fingerprint" locations in the trail of breadcrumbs to determine where the user 104 is currently located relative to previously recorded movement information. A matching may occur by using currently sensed information from a wireless signal (Wi-Fi access point or a GPS unit) to previously recorded movement information for a breadcrumb.

Similar to the image discussion in FIG. 6, the user interface 700 may also display a representative image 706 taken of the environment corresponding to one or more of the breadcrumbs. In this example, the image 706 shows where the vehicle is parked near an exit and on a floor level identified as "Blue Level."

In some implementations, the map with coordinates from the GPS signal may be combined with breadcrumbs in the trail. For example, the trail of activity application 106 may start recording when there is no GPS signal detected and once a GPS signal is detected, the user 104 may combine the GPS information to help retrace their steps.

FIG. 8 shows another exemplary user interface for displaying a probability that a breadcrumb selected by the user 104 matches sensor information collected for the user's current location. This probability may be based, at least in part on comparison of current sensor data to sensor data collected from a Wi-Fi signal and/or a GPS signal.

The user interface 800 includes a "Probability" field indicating an "8% Accuracy" 802. The user interface also includes a Probability chart 804 that gives an indication to the user 104 of whether the user's current location matches the selected breadcrumb. The trail of activity application 106 compares previously recorded information in the breadcrumb to current or newly sensed information to determine the probability the user 104 is in the same location. The mobile device 102 may receive information there is a match and the probability indicates the user 104 is headed towards a chosen direction or a chosen level. This visual representation allows the user 104 to review and confirm that the selected breadcrumb is the breadcrumb that should be followed to locate the vehicle or that the user is headed in a correct path.

In this example, the user 104 chooses "Conference Center" location to locate a vehicle, showing only an 8% accuracy that the user 104 is currently near the chosen location. Based on this accuracy information of 8%, the user 104 may determine that the selected breadcrumb or trial is not near their current location.

The user interface 800 includes a "Then" field and "Now" field 806 to reflect the information for the trail that was previously collected as "Then" and the information for a current location of the user 104 as "Now." As shown, the user interface 800 may display detailed field positioning information 808 for the Wi-Fi signal, the GPS signal, and barometer readings of maximum, minimum, and current for the "Then" field and the "Now" field 806.

Figure 9:
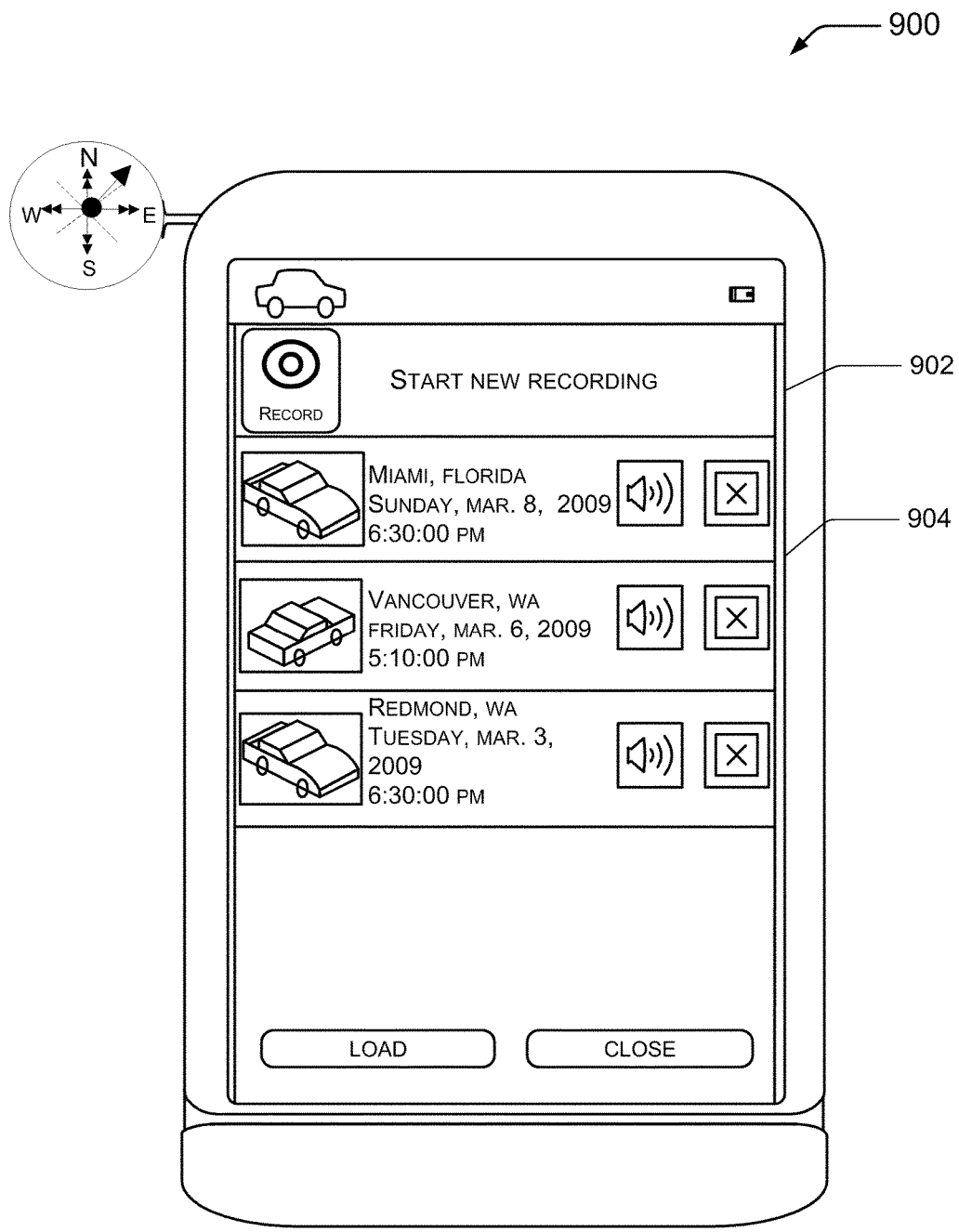
FIG. 9 is a schematic showing an exemplary user interface for displaying a representation of trails saved in memory of the mobile device.

FIG. 9 shows another exemplary user interface 900 for displaying a representation of a list of the trails saved on memory 202 of the mobile device 102. The user interface 900 includes a "Start New Recording" field 902 to begin recording movement information by first collecting sensor data for breadcrumbs in a new trail. The user interface 900 shows the representation of the trails on the list 904.

Exemplary Creating and Presenting Trail Processes

As discussed above, creating, recording, and presenting a trail may occur in a variety of ways. FIGS. 10-13 are flowcharts showing exemplary processes for creating the trail with movement information, creating the trail with movement and directional information, presenting the trail on the user interface, and determining a probability that a user's current location corresponds to a saved breadcrumb or a trail. The processes are illustrated as a collection of blocks in logical flowcharts, which represent a sequence of operations that can be implemented in hardware, software, or a combination. For discussion purposes, the processes are described with reference to the computing environment 100 shown in FIG. 1, the mobile device 102 shown in FIG. 2, and the user interfaces shown in FIGS. 3-9. However, the processes may be performed using different environments and devices. Moreover, the environments and devices described herein may be used to perform different processes.

For ease of understanding, the methods are delineated as separate steps represented as independent blocks in FIGS. 10-13. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible that one or more of the provided steps may be omitted.

Figure 10:
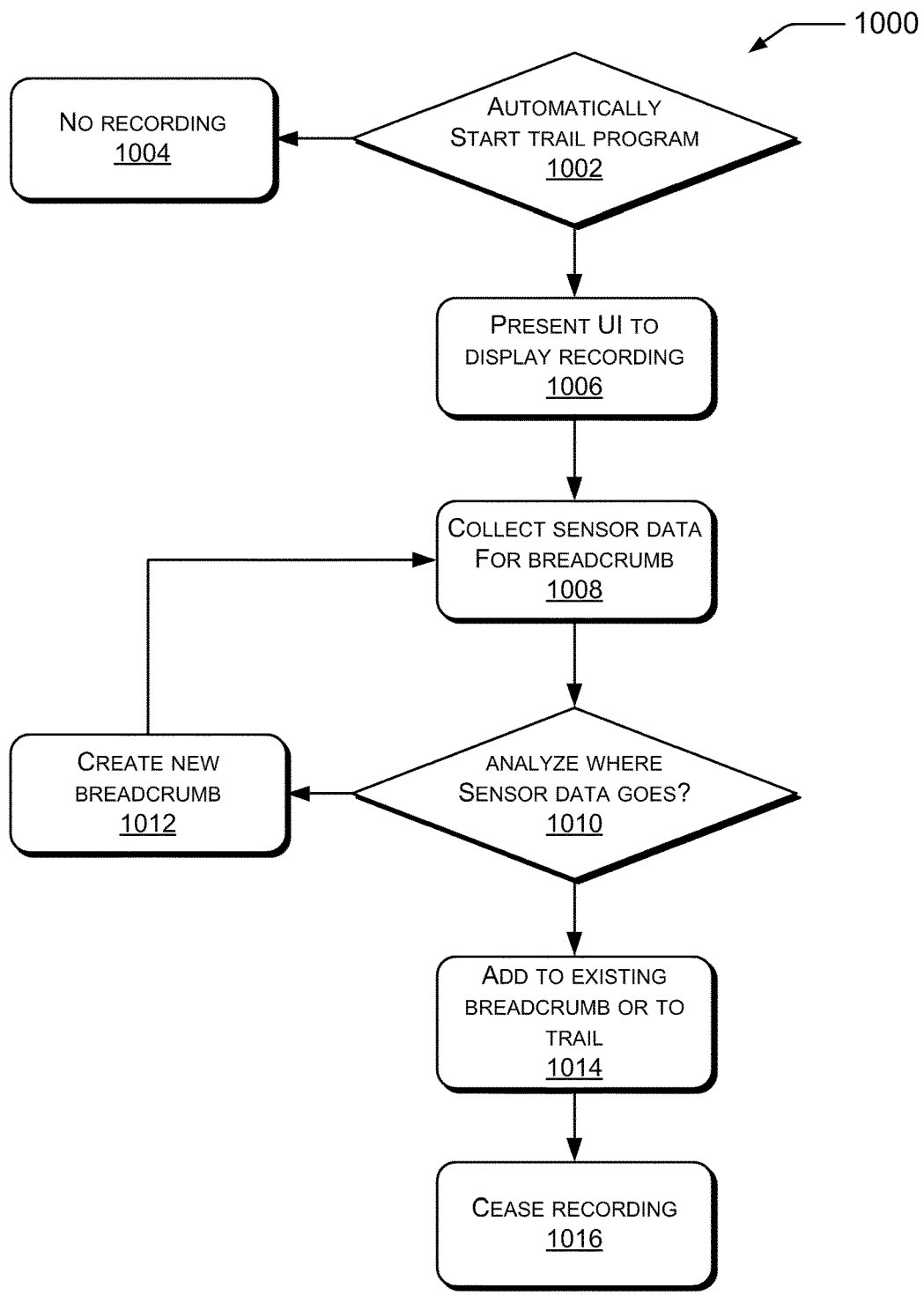
FIG. 10 is a flowchart showing an exemplary process of recording movement information in memory of the mobile device.

FIG. 10 is a flowchart illustrating an exemplary process 1000 of creating breadcrumbs for a trail with the movement information. A vehicle has been travelling at a vehicle speed and reaches a parked position in an underground garage. The mobile device 102 of the user 104, at block 1002, senses the vehicle is no longer moving by no engine noise, the user 104 is walking versus riding, or through loss of association with a personal network area device located in the vehicle, and automatically starts recording a trail on the trail of activity application 106 residing on the mobile device 102. The trail of activity application 106 automatically collects sensor data with the barometer module and the accelerometer module. At block 1004, the mobile device 102 will not begin recording a trail of activity when, for example, the mobile device 102 is still moving, a wireless signal (e.g., presence of a hands free device) is detected by the mobile device 102 indicating the user is still in a vehicle, the user 104 may have turned off a recording function by a manual control, or other conditions indicate that recording should not commence.

At block 1006, the mobile device 102 presents the user 104 with a user interface 300 usable to display a recording interface, and at block 1008, the mobile device 102 collects sensor data for the breadcrumbs for the trail. As mentioned, the user interface 300 may show charts recording the barometer and accelerometer magnitude data. In other implementations, the user 104 may be using the mobile device 104 for other purposes, while the recording occurs in the background. The process 1000 collects sensor data to record for the movement information based on inferred actions of the user 104, such as whether the user is walking or not walking, whether the user is walking up or down stairs, or whether the user is riding up or down in an elevator.

Shown at block 1010, the process 1000 analyzes the sensor data collected for the movement information to determine whether to add the collected sensed data to an existing breadcrumb or to create a new breadcrumb. If at block 1012, the collected sensor data indicates a change in altitude and/or direction, then a new breadcrumb is created.

If at block 1010, the collected sensor data is not for a new breadcrumb, the process moves to block 1014. At block 1014, the collected sensor data may be added to an existing breadcrumb or as a breadcrumb to be added to the trail.

At block 1016, the recording of the movement information for breadcrumbs ceases. As previously mentioned, the recording may be terminated for many reasons that include but are not limited to, detecting a GPS signal (e.g., when the user exits the garage or building), detecting a wireless signal (e.g., a signal from a Bluetooth® hands free device in the vehicle, a signal from a Wi-Fi access point in the office, a broadcast radio signal), sensing a temperature difference, and detecting no movement of the mobile device 102 for a predetermined time.

Figure 11:
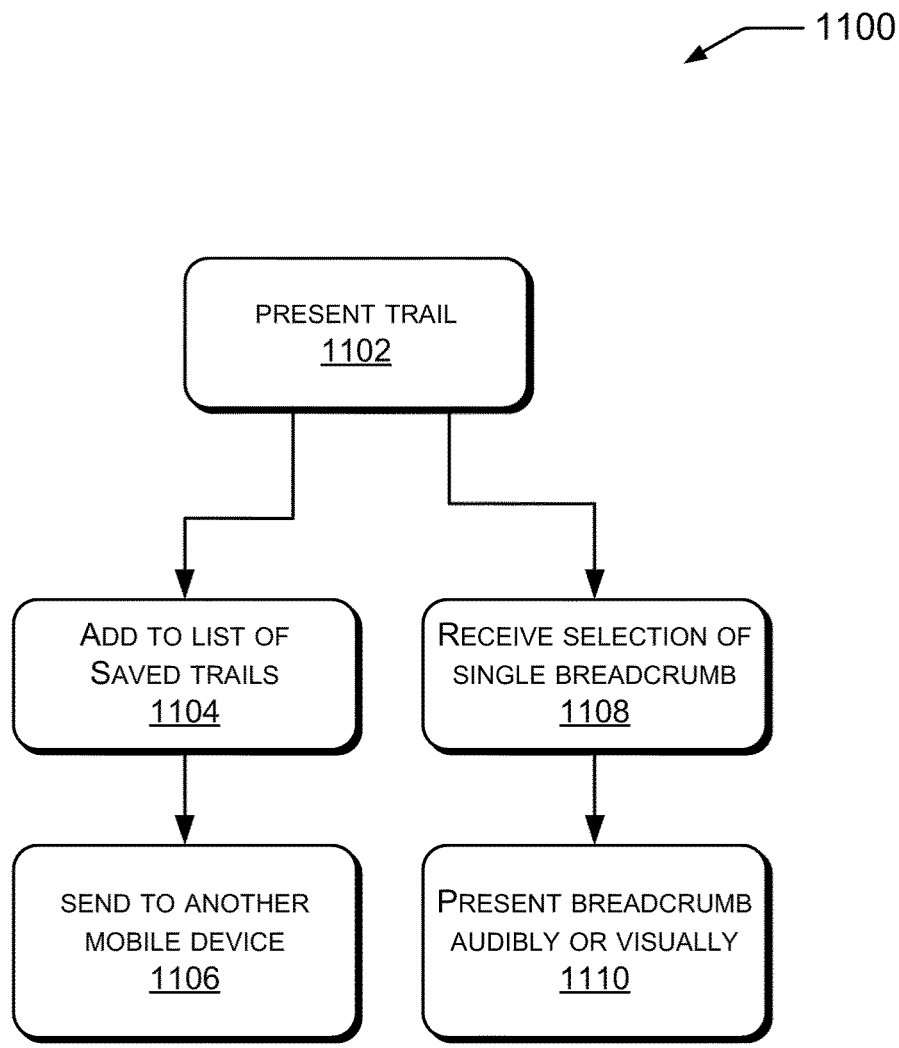
FIG. 11 is a flowchart showing an exemplary process of recording the movement information and direction relative to the earth's magnetic poles on the mobile device.

FIG. 11 is a flowchart showing an exemplary process 1100 of presenting the movement information and the directional information on the mobile device. At block 1102, a trail of activity application 106 residing on the mobile device 102 presents the user 104 with an option to view a representation of the trail. The user interface is usable to save or to select a representation of the breadcrumbs for the trail. If the user 104 does not want to view the trail, at block 1104, the trail is saved and added to a list of trails on the memory of the mobile device 102. If desired, this trail may be sent to another mobile device 1106 to share the information with a friend to locate the user 104 in a theatre, at the mall, and the like. The user 104 may attach or embed the saved trail in a form of communication (e.g., email, text message, etc.) to transmit to the other mobile device.

Returning to block 1102, the user 104 may want to view a representation of an overview of the trail of breadcrumbs. If the user 104 decides to select a single breadcrumb of interest, the user 104 taps on the single breadcrumb on the overview 1108 (a single breadcrumb is shown in detail in FIGS. 6 and 7). A particular breadcrumb selected helps guide the user 104, who may know the way to the garage but unsure of a floor level that the vehicle is parked, not certain of the number of steps, or know which direction to locate the vehicle.

At block 1110, the user interface presents the selected breadcrumb audibly, visually, or through vibrating the mobile device 102 or making a beeping noise. The application 106 may convert the movement information and directional information from a text description to an audible content. In other implementations, the activity program 106 may provide output to the user 104 through beeps, vibrations, LED signal, or environmental symbol that the user 104 is headed in a wrong direction or the correct direction.

Figure 12:
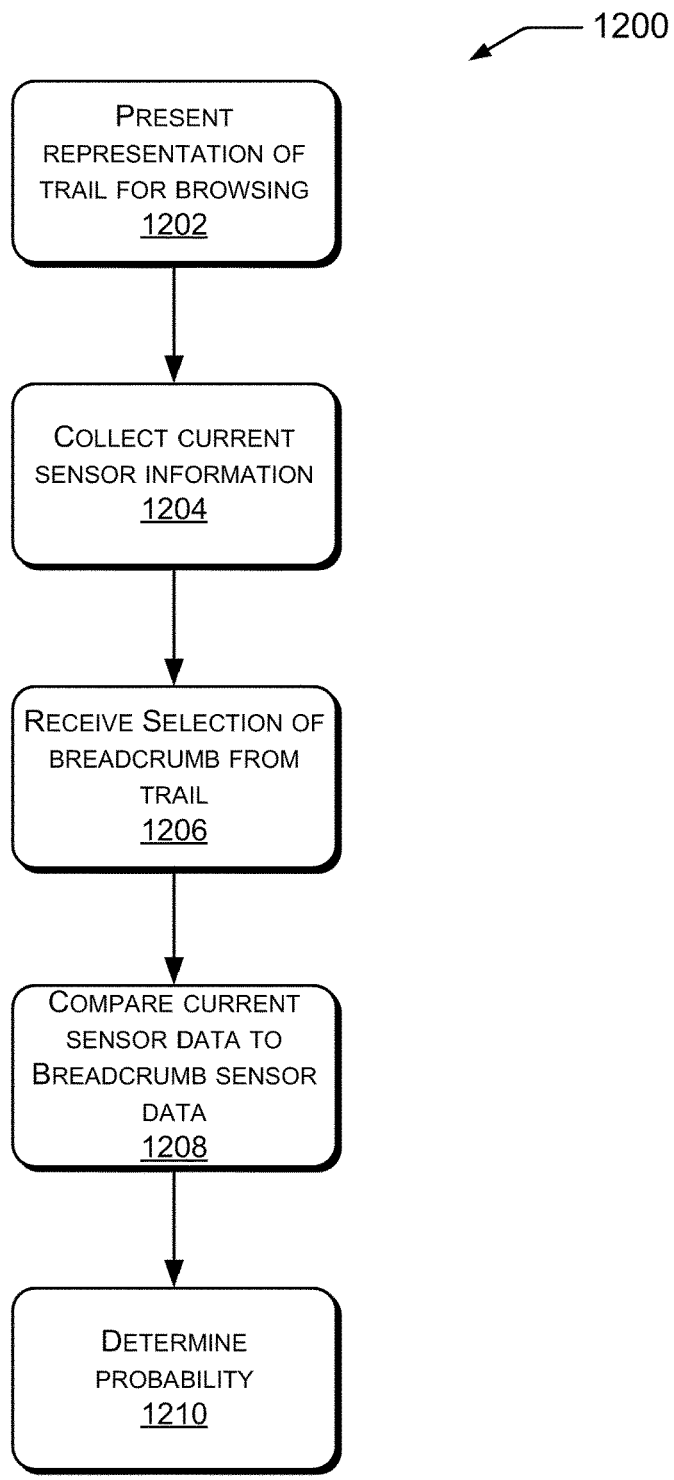
FIG. 12 is a flowchart showing an exemplary process of determining a probability that a user is near a particular breadcrumb or trail, by comparing user's current location to a saved breadcrumb.

FIG. 12 shows another exemplary process 1200 of determining a probability that a user's current location is the same as or close to a previously recorded movement information for a breadcrumb. At block 1202, the mobile device 102 presents a user 104 with the user interface usable to browse through the list of trails. The process 1200 collects new sensor information in the background 1204 that has been generated from a Wi-Fi signal or a GPS signal to determine the user's current location.

At block 1206, the user 104 selects a breadcrumb from a trail to help identify where the user's current location is relative to breadcrumbs that have been saved for that location. The process 1200 may include the "fingerprint" locations in the trail of breadcrumbs to automatically determine where the user 104 is located relative to the recorded breadcrumbs.

At block 1208, the process 1200 compares previously recorded movement information to the user's current location, from the new sensor information. The comparison determines the probability, whether the user 104 is in the same location as a saved breadcrumb. At block 1210, the user interface presents the probability of whether the new sensor information matches the information in the breadcrumb or does not match the information in the breadcrumb. The probability gives an indication of likelihood of whether the user's current location matches the information in the breadcrumb.

For example, the mobile device 102 visually presents a representation of the probability with an accuracy percentage as shown in FIG. 8. This visual representation of the probability with accuracy percentage allows the user 104 to review and confirm that the selected breadcrumb or path is the breadcrumb that may be followed to the desired location (e.g., to locate a vehicle, an item, or the user in a theatre).

In some instances, the probability with accuracy percentage may be very low, such as the 8% shown in FIG. 8, indicating that it is unlikely that the user is at or near the location where the breadcrumb was recorded.

Figure 13:
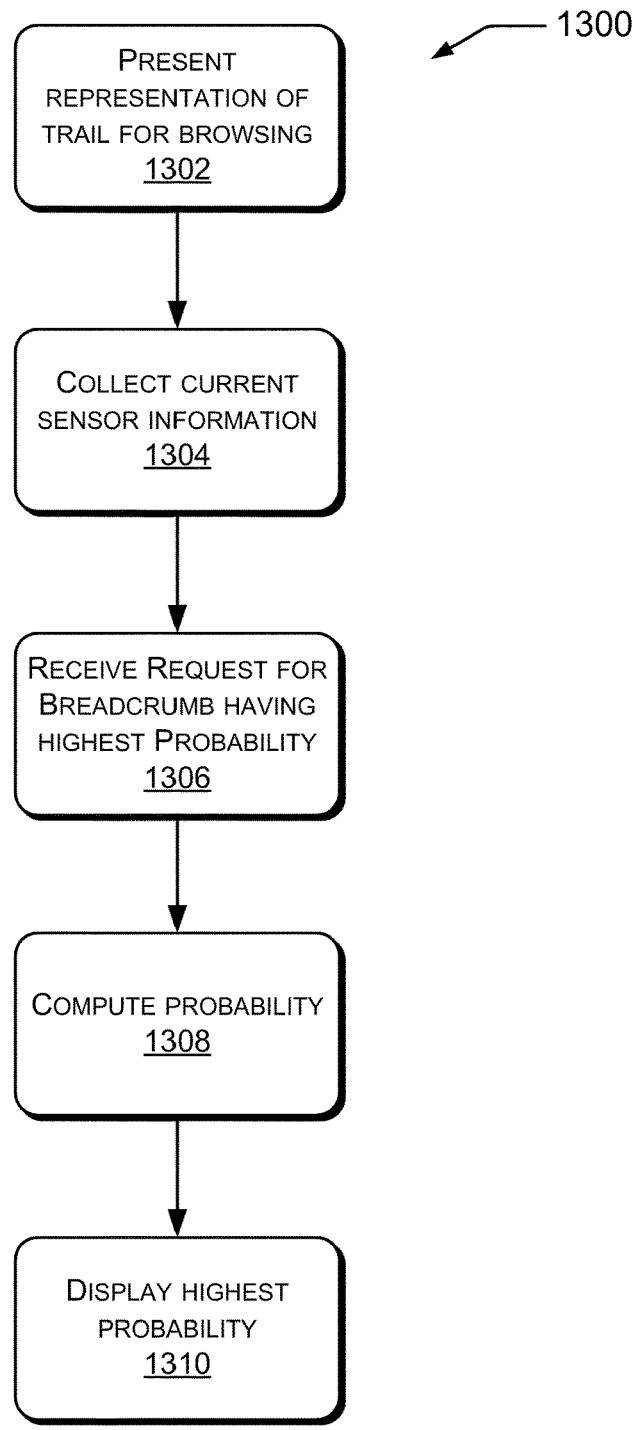
FIG. 13 is a flowchart showing an exemplary process of determining a probability that a user is near a particular breadcrumb or trail, by comparing user's current location to saved trails of activity.

FIG. 13 shows another exemplary process 1300 of determining a breadcrumb having a highest probability of being at or near a user's current location. At block 1302, the mobile device 102 presents the user 104 with the user interface usable to browse through the list of trails. The process 1300 collects new sensor information in the background 1304 that has been generated from a Wi-Fi signal, a GPS signal, or other ambient sensor data to determine the user's current location.

At block 1306, the user 104 requests a breadcrumb from the trail having the highest probability of matching (i.e., being at or near) the user's current location. The breadcrumb(s) with the highest probability to the user's current location is computed at block 1308. After the breadcrumb(s) with the highest probability are computed, the breadcrumb(s) with the highest probability are displayed 1310 in rank order on the user interface.

In another example, the application program 106 may automatically follow the user 104 retracing their steps. For example, the user 104 leaves the office to go towards the vehicle, the trail of activity application 106 detects this trail and follows the user 104 in the path back to the vehicle, advancing from breadcrumb to breadcrumb, if needed. As mentioned previously, if the user 104 is headed in a wrong direction, the trail of activity application 106 may make a beep noise or vibrate to prevent the user 104 from travelling further. If the user 104 pulls out the mobile device 102 to the trail user interface, the breadcrumb representing the user's location may be shown automatically or presented audibly, "take elevator down two floors". In some implementations, the trail of activity application 106 may not be tracking the user's progress along the trail. Here, the process relies on a GPS signal or a WiFi signal to find the user's current location when the user 104 starts and requests a breadcrumb of the user's current location.

By way of example and not limitation, the above techniques may be implemented to support sharing trail information among an individual or individuals on a contact list or as part of a group communication. In one example, the user 104 may transmit their location or the vehicle's location by transmitting the saved trail to, or to communicate with, other family members. The other family members may be attending the same function or event at a later time and need to locate the user 104.

Various instructions, methods, techniques, applications, and modules described herein may be implemented as computer-executable instructions that are executable by one or more computers, servers, or telecommunication devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various embodiments. An implementation of these modules and techniques may be stored on or transmitted across some form of computer-readable media.

The subject matter described above can be implemented in hardware, or software, or in both hardware and software. Although implementations of creating and presenting a trail have been described in language specific to structural features and/or methodological acts, it is to be understood that the subject matter defined in the appended claims is not necessarily limited to the specific features or acts described above. Rather, the specific features and acts are disclosed as exemplary forms of exemplary implementations of creating and present breadcrumbs for the trail. For example, the methodological acts need not be performed in the order or combinations described herein, and may be performed in any combination of one or more acts.

What is claimed is:

1. A method implemented at least partially by a mobile device, the method comprising:
   responsive to determining that a signal from a global positioning system (GPS) associated with the mobile device is unavailable, collecting, by the mobile device, location data representative of movement information from an accelerometer and a pressure sensor;
   determining, based at least in part on the location data, that at least one condition associated with generating breadcrumbs for a trail has been satisfied;
   collecting ambient sensor data representative of ambient information from one or more wireless sources to create an ambient signature for individual breadcrumbs of the trail;
   determining, based at least in part on the location data, that a user of the mobile device is walking and a number of steps;
   determining that a change in barometric pressure has occurred;
   determining that the user is changing floor levels based on the change in barometric pressure occurring at a predetermined rate during a time interval;
   analyzing the movement information to designate whether to add to an existing breadcrumb of the trail or to create a new breadcrumb for the trail;
   recording the movement information based on collected sensor data;
   categorizing the breadcrumbs into logical groups that define the trail based on the recorded movement information including details on how each breadcrumb was navigated, wherein the logical groups correspond to different activity types;
   comparing sensor data for ambient information of a current location of the mobile device with the ambient signatures to identify whether the current location of the mobile device is at a specific breadcrumb of the breadcrumbs;
   visually displaying, on a display of the mobile device, (i) the movement information including details on how at least one breadcrumb in the logical groups was navigated and (ii) a representation that the mobile device is near the specific breadcrumb based at least on the compared ambient signatures, wherein the details on how at least one breadcrumb in the logical groups was navigated includes an identification of an activity type corresponding to the logical group of the at least one breadcrumb; and
   sharing the trail, including the breadcrumbs categorized into the logical groups that define the trail, with another mobile device.

2. The method of claim 1, wherein recording the movement information comprises at least one of (i) activating a start function in response to detecting a manual action of the user on a user interface of the mobile device, and (ii) automatically recording in response to (a) determining the mobile device is no longer moving at a travelling vehicle speed based on an absence of engine noise, (b) detecting the user is walking versus riding in a vehicle, or (c) detecting a wireless personal area network device signal is no longer in range of the mobile device.

3. The method of claim 1, further comprising discontinuing recording the movement information automatically (i) when the mobile device has been stationary for a period of time, (ii) when a change in temperature reading is detected for a predetermined time interval, (iii) when a GPS signal is detected, (iv) when a wireless signal is detected, (v) when a signal from a Wi-Fi access point is detected, or (vi) when a broadcast radio signal is detected.

4. The method of claim 1, wherein sharing the trail with another mobile device includes:
   saving the trail as a file in a memory of the mobile device;
   receiving a selection of a saved file; and
   attaching or embedding the saved file in a communication to transmit to the other mobile device.

5. The method of claim 1, wherein recording the movement information further comprises augmenting the movement information for the trail with data from at least one of: a compass, a magnetometer, a camera, a wireless local area network module, audio data, a GPS module, a cellular radio module, an amplitude modulated (AM) radio frequency, or a frequency modulated (FM) radio module.

6. The method of claim 1, further comprising:
   recording directional information using a compass for the trail;
   associating the movement information with the directional information for the trail;
   grouping the movement information and the directional information recorded for breadcrumbs into logical groups that define the trail;
   audibly or visually presenting the trail in a reverse order; and
   audibly or visually presenting a number of steps to walk towards a direction or a number of floor levels.

7. The method of claim 1, further comprising computing the ambient information based on the one or more wireless sources, the one or more wireless sources comprising at least one of a strength of one or more local area wireless access points, a GPS signal, one or more stationary devices broadcasting radio communications signals, or electromagnetic radiation.

8. One or more non-transitory computer-readable media encoded with instructions that, when executed by a processor of a mobile device, cause the processor to perform acts comprising:
responsive to determining that a signal from a global positioning system (GPS) associated with the mobile device is unavailable, obtaining, from sensors associated with the mobile device, sensor data associated with movement of the mobile device;
determining, based at least in part on the sensor data, that a user of the mobile device is walking;
generating, in response to determining the user is walking, a first breadcrumb for a trail of activity;
assigning the first breadcrumb to a first logical group of a plurality of logical groups corresponding to different activity types, the first logical group corresponding to a walking activity type;
determining, based at least in part on the sensor data, a number of steps of the user;
associating the number of steps of the user with the first breadcrumb;
determining, based at least in part on the sensor data, that the user is changing floor levels;
generating, in response to determining the user is changing floors, a second breadcrumb for the trail of activity;
assigning the second breadcrumb to a second logical group of the plurality of logical groups, the second logical group corresponding to an elevator activity type;
presenting, on a display of the mobile device, representations of the first and second breadcrumbs both (i) individually and (ii) sequentially in a reverse chronological order starting with a breadcrumb associated with most recently obtained sensor data, wherein the representation of the first breadcrumb identifies the first logical group assigned to the first breadcrumb and the representation of the second breadcrumb identifies the second logical group assigned to the second breadcrumb, and
sharing the trail, including the first and second breadcrumbs, with another mobile device.

9. The one or more non-transitory computer-readable media of claim 8, wherein the instructions, when executed by the processor of the mobile device, cause the processor to perform acts further comprising:
presenting a representation of the breadcrumbs of the trail of activity on a user interface, wherein each of the breadcrumbs in the representation of the breadcrumbs is selectable via the user interface to generate on the user interface corresponding sensor data obtained for the respective breadcrumb.

10. The one or more non-transitory computer-readable media of claim 8, wherein the instructions, when executed by the processor of the mobile device, cause the processor to perform acts further comprising:
presenting a representation of a breadcrumb selected from the trail of activity on a user interface;
responsive to determining that a signal from the GPS associated with the mobile device is available, presenting a representation of GPS coordinates on a map corresponding to the trail of activity on the user interface; and
presenting a representation of an image of an environment corresponding to the breadcrumb selected on the user interface.

11. The one or more non-transitory computer-readable media of claim 8, wherein the instructions, when executed by the processor of the mobile device, cause the processor to perform acts further comprising:
collecting new sensor data of current location of a mobile device with a wireless local area network module or a global positioning system (GPS) module; and
determining a probability whether the new sensor data matches the breadcrumb that has been recorded and saved for the trail of activity.

12. The one or more non-transitory computer-readable media of claim 8, wherein the instructions, when executed by the processor of the mobile device, cause the processor to perform acts further comprising:
recording directional information from a compass;
associating the directional information with the movement information;
converting the movement information and the directional information from a text description to audible content; and
audibly or visually presenting the movement information and the directional information in a reverse order of what was being recorded for the trail of activity.

13. The one or more non-transitory computer-readable media of claim 8, wherein obtaining sensor data comprises collecting sensor data without the use of a GPS signal or cellular signal.

14. One or more non-transitory computer-readable media storing instructions that, when executed by a processor of a mobile device, cause the mobile device to perform acts comprising:
responsive to determining that a signal from a global positioning system (GPS) associated with the mobile device is unavailable, collecting accelerometer data and pressure sensor data from an initial starting position to an end position of the mobile device, the data to represent breadcrumbs of a trail of activity;
collecting ambient data received from one or more wireless sources from the initial starting position to the end position of the mobile device;
storing, based on the collected ambient data, an ambient signature for each of the breadcrumbs of the trail of activity;
categorizing each of the represented breadcrumbs based on the collected accelerometer data and pressure sensor data, each representation of the breadcrumbs is categorized according to a type of activity associated with the breadcrumb, the type of activity inferred from the collected accelerometer data and pressure sensor data;
comparing, via the processor of the mobile device, ambient data of a current location of the mobile device with the stored ambient signature of a categorized breadcrumb to identify whether the current location of the mobile device is at a specific breadcrumb of the breadcrumbs;
visually presenting, on a display of the mobile device, (i) a first representation of the breadcrumbs of the trail of activity on a user interface and (ii) a second representation on the user interface that the mobile device is at a specific breadcrumb based at least on the compared ambient data of the current location and the ambient signature, wherein visually presenting the first representation of the breadcrumbs includes visually identifying the type of activity associated with each breadcrumb; and sharing the trail, including the categorized breadcrumbs, with another mobile device.

15. The one or more non-transitory computer-readable media of claim 14, the user interface further comprising presenting a representation of a breadcrumb as:

a number of floor levels to walk up or down stairs;

a number of floor levels to ride in an elevator; or a vehicle.

16. The one or more non-transitory computer-readable media of claim 14, the user interface further comprising presenting an amount of time in minutes and seconds and a number of approximate steps for travelling the trail of activity from the end position to the initial starting position following the breadcrumbs.

17. The one or more non-transitory computer-readable media of claim 14, the user interface further comprising presenting a representation of a breadcrumb with directional information of north, east, south, or west combined with a number of walking steps.

18. The one or more non-transitory computer-readable media of claim 14, the user interface further comprising:

presenting a representation of a breadcrumb selected in the trail of activity;

presenting a representation of GPS coordinates on a map, the GPS coordinates corresponding to the breadcrumbs in the trail of activity when a GPS signal is available; and presenting a representation of an image of an environment corresponding to the breadcrumb selected in the trail of activity.

19. The one or more non-transitory computer-readable media of claim 14, the user interface further comprising:

presenting a user interface usable to start recording a new breadcrumb for a new trail; and presenting a user interface usable to select a trail from the list of trails saved.

* * * * *